United States Patent
Liu et al.

(10) Patent No.: US 10,542,253 B2
(45) Date of Patent: Jan. 21, 2020

(54) METHOD OF VIDEO CODING USING PREDICTION BASED ON INTRA PICTURE BLOCK COPY

(71) Applicant: HFI Innovation Inc., Zhubei Hsinchu County (TW)

(72) Inventors: Shan Liu, San Jose, CA (US); Xiaozhong Xu, Fremont, CA (US)

(73) Assignee: HFI Innovation Inc., Zhubei Hsinchu County (TW)

( * ) Notice: Subject to any disclaimer, the term of this patent is extended or adjusted under 35 U.S.C. 154(b) by 0 days.

(21) Appl. No.: 16/424,322

(22) Filed: May 28, 2019

(65) Prior Publication Data
US 2019/0281288 A1  Sep. 12, 2019

Related U.S. Application Data (63) Continuation of application No. 15/031,117, filed as application No. PCT/CN2014/091140 on Nov. 14, 2014.

(Continued)

(51) Int. Cl.
| | |
|---|---|
| *H04N 11/02* | (2006.01) |
| *H04N 19/107* | (2014.01) |
| *H04N 19/169* | (2014.01) |
| *H04N 19/176* | (2014.01) |
| *H04N 19/159* | (2014.01) |

(Continued)

(52) U.S. Cl.
CPC ......... *H04N 19/107* (2014.11); *H04N 19/103* (2014.11); *H04N 19/119* (2014.11); *H04N 19/159* (2014.11); *H04N 19/176* (2014.11); *H04N 19/1887* (2014.11); *H04N 19/70* (2014.11)

(58) Field of Classification Search
CPC .................................................... H04N 19/107
USPC ........................................ 375/240.01–240.29
See application file for complete search history.

(56) References Cited

U.S. PATENT DOCUMENTS

| | | | | |
|---|---|---|---|---|
| 4,878,230 A | * | 10/1989 | Murakami | .............. G06T 9/008 375/245 |
| 9,661,324 B2 | * | 5/2017 | Lim | ........................ H04N 19/46 |

(Continued)

FOREIGN PATENT DOCUMENTS

WO   2010/082886   7/2010

OTHER PUBLICATIONS

D. Flynn et al., "High Efficiency Video Coding (HEVC) Range Extensions Text Specification Draft 4," Sections 7.3.8.5 & 7.4.9.5, Joint Collaborative Team on Video Coding (JCT-VC) of ITU-T SG 16 WP 3 and ISO/IEC JTC 1/SC 29/WG 11, pp. 1, 47-48, 90-91 (Apr. 2013).

(Continued)

*Primary Examiner* — Leron Beck
(74) *Attorney, Agent, or Firm* — Oblon, McClelland, Maier & Neustadt, L.L.P.

(57) ABSTRACT

A method of signaling of coding modes including an IntraBC mode (Intra-block copy mode) to improve the coding efficiency is disclosed. The embodiment takes into consideration the facts that Inter prediction is more common in Inter slices than IntraBC prediction. In another embodiment, a binary sub-tree is disclosed that includes all the partition modes associated with IntraBC mode and the binary sub-tree consists of only said all members of the partition mode group.

2 Claims, 5 Drawing Sheets

Related U.S. Application Data (60) Provisional application No. 61/904,068, filed on Nov. 14, 2013.

(51) Int. Cl.
*H04N 19/103* (2014.01)
*H04N 19/119* (2014.01)
*H04N 19/70* (2014.01)

(56) References Cited

U.S. PATENT DOCUMENTS

| | | | |
|---|---|---|---|
| 10,390,046 B2 * | 8/2019 | Joshi | H04N 19/12 |
| 2006/0285594 A1 * | 12/2006 | Kim | H04N 19/176 |
| | | | 375/240.16 |
| 2009/0232217 A1 | 9/2009 | Lee | |
| 2011/0249721 A1 | 10/2011 | Karczewicz et al. | |
| 2012/0082210 A1 * | 4/2012 | Chien | H04N 19/463 |
| | | | 375/240.02 |
| 2013/0039417 A1 * | 2/2013 | Wang | H04N 19/176 |
| | | | 375/240.12 |
| 2013/0083844 A1 * | 4/2013 | Chong | H04N 19/463 |
| | | | 375/240.02 |
| 2013/0136179 A1 * | 5/2013 | Lim | H04N 19/176 |
| | | | 375/240.13 |
| 2013/0188727 A1 | 7/2013 | Lou et al. | |
| 2014/0211850 A1 * | 7/2014 | Zhang | H04N 19/159 |
| | | | 375/240.12 |
| 2014/0362917 A1 * | 12/2014 | Joshi | H04N 19/46 |
| | | | 375/240.13 |
| 2014/0376634 A1 * | 12/2014 | Guo | H04N 19/52 |
| | | | 375/240.16 |
| 2015/0063440 A1 * | 3/2015 | Pang | H04N 19/174 |
| | | | 375/240.02 |

OTHER PUBLICATIONS

"Huffman coding," Wikipedia, pp. 1-14, (Apr. 5, 2017).
X. Xu et al., "Intra Block Copy Syntax Clean Up," Joint Collaborative Team on Video Coding (JCT-VC) of ITU-T SG 16 WP 3 and ISO/IEC JTC 1/SC 29/WG 11, pp. 1-6 (Jan. 2014).
International Search Report issued in Application No. PCT/CN2014/091140 dated Jan. 26, 2015.

* cited by examiner

METHOD OF VIDEO CODING USING PREDICTION BASED ON INTRA PICTURE BLOCK COPY

CROSS REFERENCE TO RELATED APPLICATIONS

The present invention claims priority to U.S. Provisional Patent Application, Ser. No. 61/904,068, filed on Nov. 14, 2013, entitled "Methods and apparatus for intra picture block copy in video compression". The U.S. Provisional Patent Application is hereby incorporated by reference in its entirety.

TECHNICAL FIELD

The present invention relates to video coding using Intra-block copy (IntraBC) mode. In particular, the present invention relates to techniques to improve the performance or simplify the processing of the Intra-block copy (IntraBC) coding mode for screen content coding or video coding.

BACKGROUND

Figure 1:
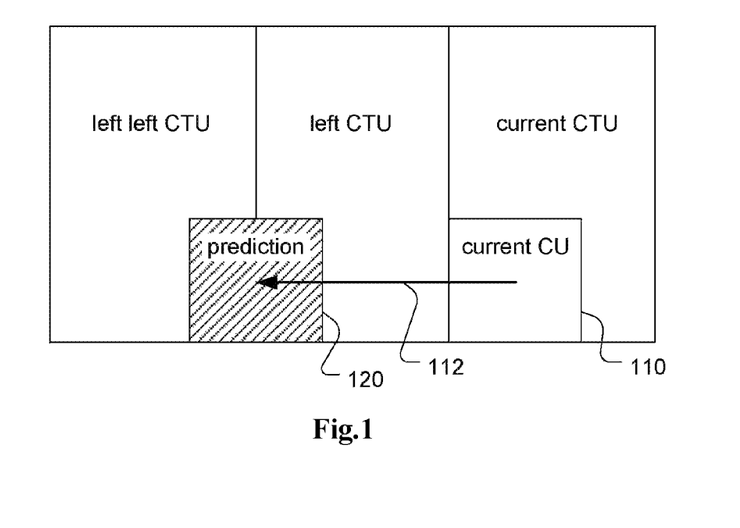
FIG. 1 illustrates an example of Intra motion compensation according to the Intra-block copy (IntraBC) mode, where a horizontal displacement vector is used.

In the current development of range extension (RExt) or screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC Range Extension and screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the Intra MC is different from the motion compensation used for Inter prediction in at least the following areas:

MVs are restricted to be 1-D for Intra MC (i.e., either horizontal or vertical) while Inter prediction uses 2-D motion estimation.

Binarization is fixed length for Intra MC while Inter prediction uses exponential-Golomb.

Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods were disclosed:

Method 1—Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.

Method 2: No Motion vector prediction. The MV is coded using the exponential-Golomb codes that are used for MVD in HEVC.

Another difference disclosed in JCTVC-N0256 is that the 2-D Intra MC is further combined with the pipeline friendly approach:

1. No interpolation filters are used,
2. MV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D Intra MC, the removal of interpolation filters, and the search area constraint to the current CTU and the left CTU have been adopted in a new version draft standard. The CU level syntax corresponding to JCTVC-N0256 has been incorporated in *High Efficiency Video Coding (HEVC) Range Extension text specification: Draft 4 (RExt Draft 4)*, Flynn, et al., Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N1005. The CU level syntax adopted in RExt Draft 4 is shown in Table 1.

TABLE 1

| | Descriptor | Note |
|---|---|---|
| coding_unit( x0, y0, log2CbSize ) { | | |
|   if( transquant_bypass_enabled_flag ) | | |
|     cu_transquant_bypass_flag | ae(v) | |
|   if( slice_type != I ) | | |
|     cu_skip_flag[ x0 ][ y0 ] | ae(v) | |
|   nCbS = ( 1 << log2CbSize ) | | |
|   if( cu_skip_flag[ x0 ][ y0 ] ) | | |
|     prediction_unit( x0, y0, nCbS, nCbS ) | | |
|   else { | | |
|     if( intra_block_copy_enabled_flag ) | | (1-1) |
|       intra_bc_flag[ x0 ][ y0 ] | ae(v) | |
|     if( !intra_bc_flag[ x0 ][ y0 ] ) { | | (1-2) |
|       if( slice_type != I ) | | (1-3) |
|         pred_mode_flag | ae(v) | |
|       if( CuPredMode[ x0 ][ y0 ] != MODE_INTRA \|\| | | (1-4) |
|         log2CbSize = = MinCbLog2SizeY ) | | |
|         part_mode | ae(v) | |
|     } | | |
|   ...... | | |

As shown in Table 1, a test "if(intra_block_copy_enabled_flag)" is performed as indicated by Note (1-1). The IntraBC flag (i.e., intra_bc_flag[x0][y0]) is incorporated if Intra block copy is enabled as indicated by intra_block_copy_enabled_flag. Syntax element intra_bc_flag indicates whether the associated block is coded in the IntraBC mode. Whether the current block is coded in Non-Intra block copy mode (i.e., if(!intra_bc_flag[x0][y0]) is checked as indicated by Note (1-2), and pred_mode_flag and part_mode may be incorporated according to the tests in Notes (1-3) and (1-4) if the block is not coded in the Intra block copy mode. Syntax element pred_mode_flag equal to 0 specifies that the current coding unit is coded in Inter prediction mode. pred_mode_flag equal to 1 specifies that the current coding unit is coded in Intra prediction mode. Syntax element part_mode specifies partitioning mode of the current coding unit.

Figure 2A:
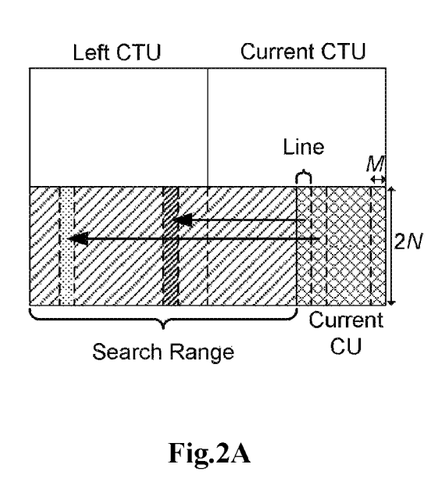
FIGS. 2A-B illustrate examples of line-based Intra-block copy (IntraBC) prediction, where a coding unit (CU) is partitioned into vertical or horizontal blocks, named lines.
Figure 2B:
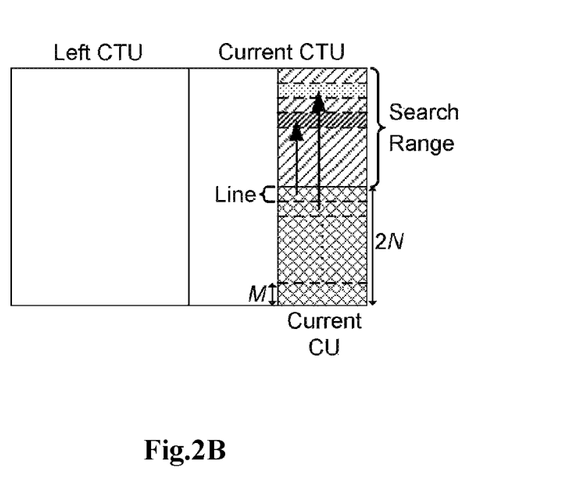

Another variation of IntraBC method, named Line-based Intra Block Copy has been disclosed by Chen, et al., in *AHG8: Line-based Intra Block Copy*, Joint Collaborative Team on Video Coding (JCT-VC) of ITU-T SG 16 WP 3 and ISO/IEC JTC 1/SC 29/WG 11, JCTVC-O0205, 15th Meeting: Geneva, CH, 23 Oct.-1 Nov. 2013, Document: JCTVC-O0205 (hereinafter JCTVC-O0205). FIG. 2A and FIG. 2B illustrate examples of line-based IntraBC method as disclosed in JCTVC-O0205, where a 2N×2N CU is split equally into multiple block partitions of size M×2N (FIG. 2A) or 2N×M (FIG. 2B). The partitioned blocks are termed as lines and M represents a power-of-2 integer and is smaller than 2N. For each line, pixels are predicted in the same way as the original IntraBC except: (1) the block size is of M×2N or 2N×M, and (2) blocks of size M×2N and 2N×M are restricted to only perform horizontal search and vertical search, respectively. Therefore, there are 2N/M Intra displacement vectors per CU needed to be searched and signaled. FIG. 2A illustrates an example of partitioning the CU horizontally into M×2N lines or line blocks. Each line block may be predicted by a prediction line block in the left CTU that has been reconstructed already. The arrows in FIG. 2A represent the displacement vectors or motion vectors for corresponding line blocks. FIG. 2B illustrates an example of partitioning the CU vertically into 2N×M lines or line blocks. Each line block may be predicted by a prediction line block in the CTU above the current CU that has been reconstructed already. The arrows in FIG. 2B represent the displacement vectors or motion vectors for corresponding line blocks. The improvement according to JCTVC-O0205 has shown significant BD-rate reduction over the conventional IntraBC approach. The BD-rate is a well-known performance measurement in the field of video coding.

Table 2 illustrates an example of CU level syntax modification to support the line-based IntraBC as disclosed in JCTVC-O0205.

TABLE 2

| | Descriptor | Note |
|---|---|---|
| coding_unit( x0, y0, log2CbSize ) { | | |
|   if( transquant_bypass_enabled_flag ) | | |
|     cu_transquant_bypass_flag | ae(v) | |
|   if( slice_type != I ) | | |
|     cu_skip_flag[ x0 ][ y0 ] | ae(v) | |
|   nCbS = ( 1 << log2CbSize ) | | |
|   if( cu_skip_flag[ x0 ][ y0 ] ) | | |
|     prediction_unit( x0, y0, nCbS, nCbS ) | | |
|   else { | | |

TABLE 2-continued

| | Descriptor | Note |
|---|---|---|
|   if( intra_block_copy_enabled_flag ) | | |
|     intra_bc_flag[ x0 ][ y0 ] | ae(v) | |
|   if( !intra_bc_flag[ x0 ][ y0 ] ) { | | |
|     if( slice_type != I ) | | |
|       pred_mode_flag | ae(v) | |
|     if( CuPredMode[ x0 ][ y0 ] != MODE_INTRA \|\| | | |
|       log2CbSize = = MinCbLog2SizeY ) | | |
|       part_mode | ae(v) | |
|     if( CuPredMode[ x0 ][ y0 ] == MODE_INTRA | | (2-1) |
|       && PartMode != PART_NxN ) { | | |
|       ivm_flag | ae(v) | (2-2) |
|       if( ivm_flag) | | (2-3) |
|         ivm_dir | ae(v) | (2-4) |
|       } | | |
|   } | | |
| . . . . . . | | |

As shown in Table 2, a flag ivm_flag is incorporated in the syntax table as indicated by Note (2-2) if the prediction mode is MODE_INTRA and the partition mode is not PART_NxN as indicated by Note (2-1). ivm_flag equal to 1 specifies that line-based IntraBC is used for the current CU. ivm_flag equal to 0 specifies that line-based IntraBC is not used for the current CU. If the flag ivm_flag has a value of 1 as indicated by Note (2-3), an addition flag ivm_dir is incorporated as indicated by Note (2-4). ivm_dir equal to 1 specifies that line-based IntraBC is along the vertical direction for the current CU. ivm_flag equal to 0 specifies that line-based IntraBC is along the horizontal direction for the current CU. According to JCTVC-O0205, the value of M (i.e., 1, 4, or N) is pre-set, i.e. hard coded without signaling.

Figure 3A:
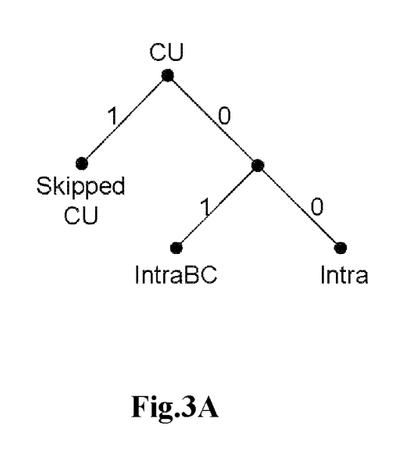
FIGS. 3A-B illustrate binary trees of CU (coding unit) prediction modes according to the current Range Extension for High Efficiency Video Coding (RExt) for Intra and Inter slices.
Figure 3B:
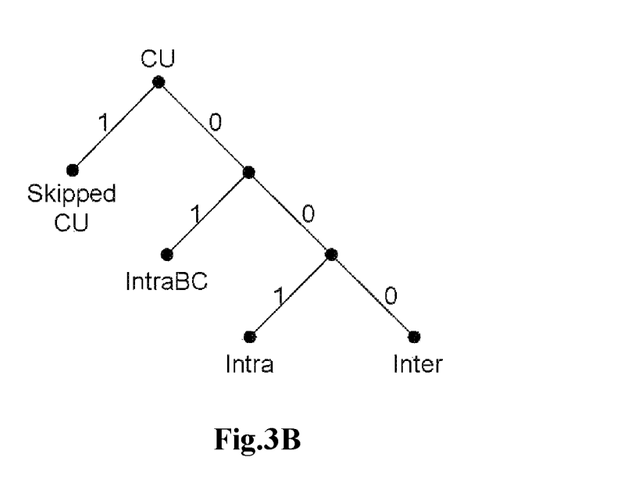

The signaling orders of The Inter, Intra and IntraBC prediction modes according to the existing RExt for the Intra slice and the Inter slice are shown in FIG. 3A and FIG. 3B respectively.

SUMMARY

A method of signaling of coding modes including an IntraBC mode (Intra-block copy mode) according to the present invention is disclosed. This embodiment takes into consideration the facts that Inter prediction is more common in Inter slices than IntraBC prediction, and IntraBC prediction is currently treated as a special Intra prediction. Accordingly, a binary tree for signaling prediction modes of a coding unit (CU) is disclosed for improving the performance.

In another embodiment, multiple partition modes are allowed for IntraBC coding. A binary sub-tree according to this embodiment includes all the partition modes associated with IntraBC mode and the binary sub-tree consists of only said all members of the partition mode group. The partition mode group may consist of 2N×2N, 2N×M, and M×2N modes, and N and M are positive integers and M is not larger than N. In one example, the binary sub-tree for the 2N×2N, 2N×M mode and M×2N modes corresponds to {1, 01, 00} respectively. In another example, the partition mode group consists of 2N×2N mode, 2N×N mode, N×2N mode, and N×N modes and the binary sub-tree for the 2N×2N, 2N×N, N×2N and N×N modes corresponds to {1, 01, 001, 000} respectively or {1, 001, 01, 000} respectively. The partition mode group may consist of 2N×2N, 2N×N and N×2N modes when the CU is larger than 8×8, and the binary sub-tree for the 2N×2N, 2N×N and N×2N modes corresponds to {1, 01, 00} respectively or {1, 00, 01} respectively. The partition mode group may also consist of 2N×2N, 2N×N, N×2N, nL×2N, nR×2N, 2N×nU and 2N×nD modes if the current coding unit is larger than 8×8, and the binary sub-tree for the 2N×2N, 2N×N, N×2N, nL×2N, nR×2N, 2N×nU and 2N×nD modes corresponds to {1, 011, 001, 0100, 0101, 0000, 0001} respectively or {1, 001, 011, 0000, 0001, 0100, 0101} respectively.

Various control syntax elements may be incorporated in a sequence level, a picture level or a slice level of the bitstream. For example, an enable flag may be used to indicate whether the partition mode group is allowed to include one or more asymmetric partition modes for a corresponding sequence, a corresponding picture or a corresponding slice. In another example, an enable flag may be used to indicate whether the partition mode group is allowed to include one or more non-square partition modes. In another example, an enable flag may be used to indicate whether the partition mode group is allowed to include one or more multiple partition modes to partition the coding unit into more than two sub-blocks. In another example, an enable flag may be used to indicate a total number of sub-blocks that the coding unit is partitioned into the total number of sub-blocks.

DETAILED DESCRIPTION

In order to improve the performance or to reduce the complexity of Intra-block copy (IntraBC) prediction, the present invention discloses various improvements and simplified IntraBC prediction.

First Embodiment

In the binary tree associated with IntraBC prediction mode signaling shown in FIG. 3A and FIG. 3B, the binary coding tree may not be efficient for the following reasons. Inter prediction is sometimes more common in Inter slices than IntraBC prediction. However, the binary code for Inter mode in an Inter Slice as shown in FIG. 3B has a bit length of 3, which is a longest one. Also, IntraBC prediction is currently treated as a special Intra prediction (i.e. MODE_INTRA). Accordingly, the priority of Inter prediction and IntraBC prediction modes are modified according to the first embodiment of the present invention, as shown in FIG. 4A and FIG. 4B.

Figure 4A:
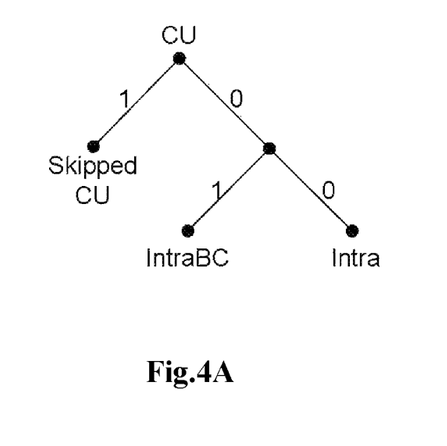
FIGS. 4A-B illustrate binary trees of CU (coding unit) prediction modes according to an embodiment of the present invention for Intra and Inter slices.
Figure 4B:
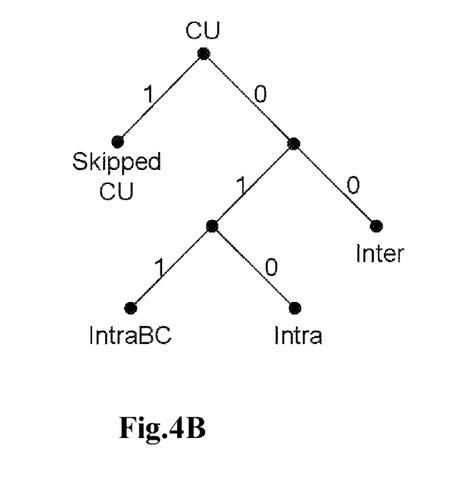

The binary coding tree for the Intra slice as shown in FIG. 4A remains to be the same. However, the binary coding tree for the Inter slice as shown in FIG. 4B has been modified to assign a codeword with code length of 2 to the Inter mode. Furthermore, the code lengths for IntraBC and Intra modes are 3. Table 3 illustrates an example of CU level syntax design to support the first embodiment.

TABLE 3

| | Descriptor | Note |
|---|---|---|
| coding_unit( x0, y0, log2CbSize ) { | | |
|   if( transquant_bypass_enabled_flag ) | | |
|     cu_transquant_bypass_flag | ae(v) | |
|   if( slice_type != I) | | |
|     cu_skip_flag[ x0 ][ y0 ] | ae(v) | |
|   nCbS = ( 1 << log2CbSize ) | | |
|   if( cu_skip_flag[ x0 ][ y0 ] ) | | |
|     prediction_unit( x0, y0, nCbS, nCbS ) | | |
|   else { | | |
|     if( intra_block_copy_enabled_flag ) | | (3-1) |
|       intra_bc_flag[ x0 ][ y0 ] | ae(v) | |
|     if( !intra_bc_flag[ x0 ][ y0 ] ) { | | (3-2) |
|       if( slice_type != I ) | | |
|         pred_mode_flag | ae(v) | |
|     if( intra_block_copy_enabled_flag&&pred_mode_flag) | | (3-3) |
|       intra_bc_flag[ x0 ][ y0 ] | ae(v) | (3-4) |
|     if( !intra_bc_flag[x0][y0] \| \| (CuPredMode[x0][y0] != MODE_INTRA \| \| log2CbSize == MinCbLog2SizeY)) | | (3-5) |
|       part_mode | ae(v) | |
|   } | | |
| . . . | | |

In Table 3, the syntax shown with slant lined background as indicated from Note (3-1) to Note (3-2) are deleted according to this embodiment. The IntraBC flag (i.e., intra_bc_flag[x0][y0]) is incorporated as indicated by Note (3-4) if the IntraBC mode enabled and pred_mode_flag has a value of 1 as indicated by Note (3-3). Furthermore, the test as indicated in Note (3-5) has also been modified by including "!intra_bc_flag[x0][y0]".

Second Embodiment

Figure 5A:
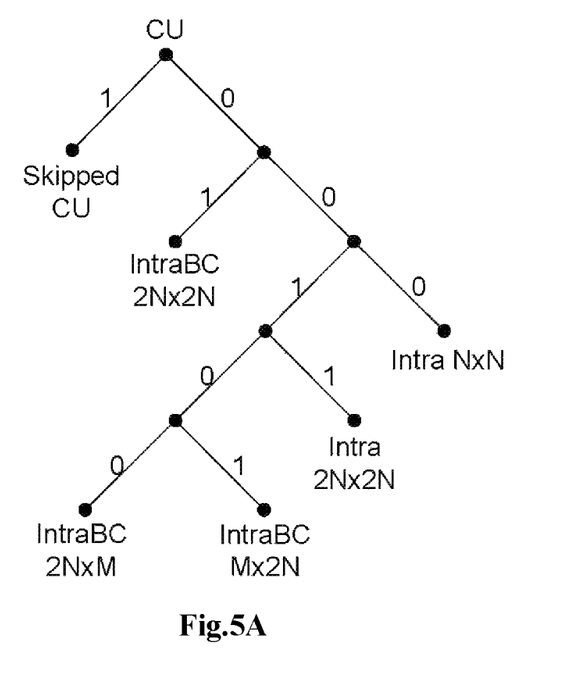
FIGS. 5A-B illustrate binary trees of CU (coding unit) prediction modes according to method disclosed in JCTVC-O0205 for Intra and Inter slices.
Figure 5B:
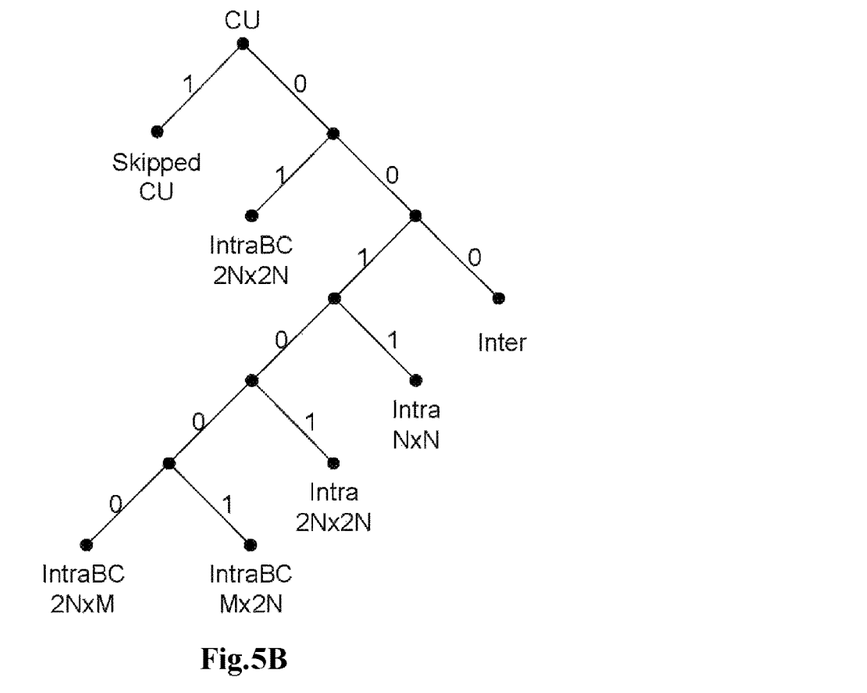
Figure 6A:
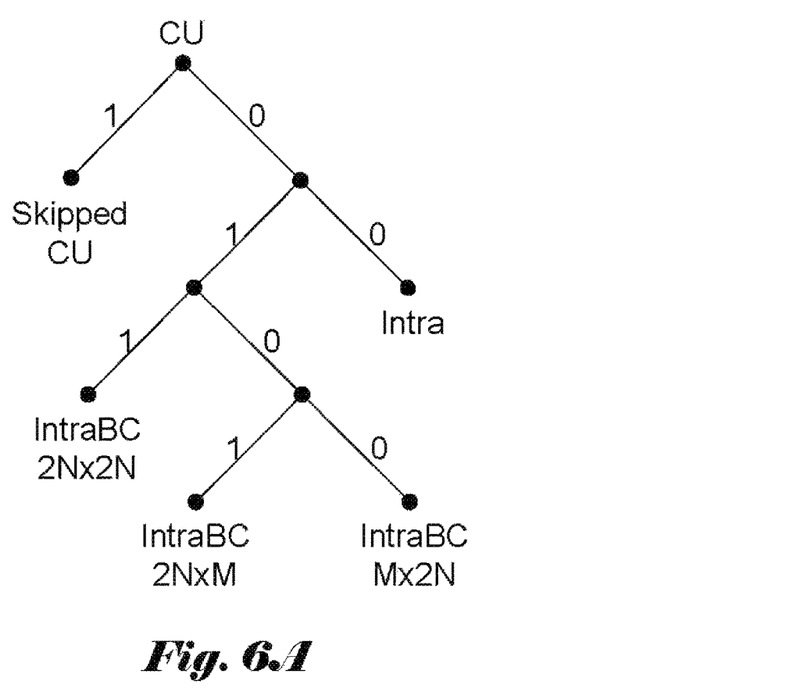
FIGS. 6A-B illustrate binary trees of CU (coding unit) prediction modes under one sub-tree according to an embodiment of the present invention for Intra and Inter slices.
Figure 6B:
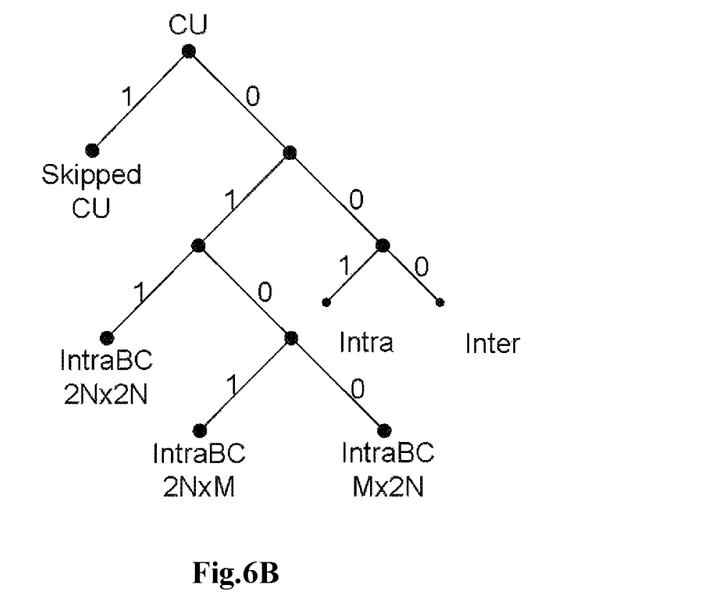

In RExt Draft 4, when IntraBC mode is used and the prediction block size is not 2N×2N, the prediction direction (i.e., vertical or horizontal) is actually signaled under the Intra prediction mode branch, as shown in FIG. 5A and FIG. 5B for the Intra slice and the Inter slice respectively. One drawback of this arrangement is that the IntraBC direction needs the Intra prediction partition information to parse when the IntraBC prediction block size is not 2N×2N. In other words, the parsing of IntraBC prediction partition modes regarding size and direction is dependent on Intra prediction partition mode. This dependency is not desired in hardware as well as software design and it is not necessary. In order to overcome this issue, the second embodiment of the present invention consolidates the IntraBC prediction mode signaling (i.e. 2N×2N, 2N×M or M×2N) into one branch, as shown in FIG. 6A and FIG. 6B for the Intra slice and the Inter slice respectively. As shown in FIG. 6A and FIG. 6B, the branches associated with the IntraBC prediction mode signaling (i.e. 2N×2N, 2N×M or M×2N) for both the Intra slice and the Inter slice are the same.

TABLE 4

| | Descriptor | Note |
|---|---|---|
| coding_unit( x0, y0, log2CbSize ) { | | |
|   if( transquant_bypass_enabled_flag ) | | |
|     cu_transquant_bypass_flag | ae(v) | |
|   if( slice_type != I ) | | |
|     cu_skip_flag[ x0 ][ y0 ] | ae(v) | |
|   nCbS = ( 1 << log2CbSize ) | | |
|   if( cu_skip_flag[ x0 ][ y0 ] ) | | |
|     prediction_unit( x0, y0, nCbS, nCbS ) | | |
|   else { | | |
|     if( intra_block_copy_enabled_flag ) | | |
|       intra_bc_flag[ x0 ][ y0 ] | ae(v) | |
|     if( !intra_bc_flag[ x0 ][ y0 ] && slice_type != I ) | | (4-1) |
|       if( slice_type != I ) | | (4-2) |
|         pred_mode_flag | ae(v) | (4-3) |
|     if( intra_bc_flag[ x0 ][ y0 ] \|\| ( CuPredMode | | (4-4) |
|       [ x0 ][ y0 ] != MODE_INTRA \|\| | | |
|       log2CbSize == MinCbLog2SizeY) | | |
|       part_mode | ae(v) | |
|   } | | |
| ... | | |

In Table 4, a test condition for non-IntraBC mode in a non-Intra slice is incorporated as indicated by Note (4-1). On the other hand, the test for a non-Intra slice in the conventional syntax design is removed as indicated by Note (4-2). The flag pred_mode_flag is incorporated as indicated by Note (4-3). An additional element "intra_bc_flag[x0][y0]" is added to the test as indicated by Note (4-4).

When intra_bc_flag equals to 1, the binarization of part_mode according to the second embodiment is shown in Table 5, M can be any positive integer that is a power of 2 and less than or equal to N. It is noted that the second embodiment may also be combined with the first embodiment.

TABLE 5

| part_mode | PartMode | Bin string |
|---|---|---|
| 0 | PART_2Nx2N | 1 |
| 1 | PART_2NxM | 01 |
| 2 | PART_Mx2N | 00 |

Third Embodiment

In this embodiment, IntraBC prediction can also be applied to where an N×N partition is used, such as the N×N Intra prediction mode. Each N×N partition is independently predicted from a matching block within a picture, a slice, or a partial picture, or a partial slice, a region of the picture or slice, or the same CTU containing the current block. Accordingly, there are four Intra motion vectors per CU that need to be searched and signaled. Two examples for the binarization of part_mode according to this embodiment including 2N×M and M×2N partition modes are shown in Tables 6 and 7, where M is set to N and intra_bc_flag is equal to 1.

TABLE 6

| part_mode | PartMode | Bin string |
|---|---|---|
| 0 | PART_2Nx2N | 1 |
| 1 | PART_2NxN | 01 |
| 2 | PART_Nx2N | 001 |
| 3 | PART_NxN | 000 |

TABLE 7

| part_mode | PartMode | Bin string |
|---|---|---|
| 0 | PART_2Nx2N | 1 |
| 1 | PART_Nx2N | 01 |
| 2 | PART_2NxN | 001 |
| 3 | PART_NxN | 000 |

In another example, the N×N partition for IntraBC is only allowed when the block is a SCU (smallest CU). Two examples of the binarization of part_mode are shown in Tables 8 and 9 with intra_bc_flag equal to 1. In Tables 8 and 9, the condition, "log 2CbSize>Min Cb Log 2SizeY" implies that the current block size is greater than the smallest CU, and the condition, "log 2CbSize==Min Cb Log 2SizeY" implies that the current block is an SCU.

TABLE 8

| | | Bin string | |
|---|---|---|---|
| part_mode | PartMode | log2CbSize > MinCbLog2SizeY | log2CbSize == MinCbLog2SizeY |
| 0 | PART_2Nx2N | 1 | 1 |
| 1 | PART_2NxN | 01 | 01 |
| 2 | PART_Nx2N | 00 | 001 |
| 3 | PART_NxN | | 000 |

TABLE 9

| | | Bin string | |
|---|---|---|---|
| part_mode | PartMode | log2CbSize > MinCbLog2SizeY | log2CbSize == MinCbLog2SizeY |
| 0 | PART_2Nx2N | 1 | 1 |
| 1 | PART_Nx2N | 01 | 01 |
| 2 | PART_2NxN | 00 | 001 |
| 3 | PART_NxN | | 000 |

In yet another example, the N×N partition is only allowed when the IntraBC CU size is greater than 8×8 (i.e., N>4). The binarization of part_mode is shown in Tables 10 and 11 for intra_bc_flag equal to 1. The condition, "log 2CbSize>Min Cb Log 2SizeY\|\|log 2CbSize==Min Cb Log 2SizeY && log 2CbSize==3" implies that the current block size is "8×8" or the current block is not an SCU. The condition, "log 2CbSize==Min Cb Log 2SizeY && log 2CbSize>3" implies that "the current block is an SCU but the size is greater than 8×8".

TABLE 10

| | | Bin string | |
|---|---|---|---|
| part_mode | PartMode | log2CbSize > MinCbLog2SizeY \|\| log2CbSize == MinCbLog2SizeY && log2CbSize == 3 | log2CbSize == MinCbLog2SizeY && log2CbSize > 3 |
| 0 | PART_2Nx2N | 1 | 1 |
| 1 | PART_2NxN | 01 | 01 |
| 2 | PART_Nx2N | 00 | 001 |
| 3 | PART_NxN | | 000 |

TABLE 11

| part_mode | PartMode | Bin string | |
|---|---|---|---|
| | | log2CbSize > MinCbLog2SizeY \|\| log2CbSize = = MinCbLog2SizeY && log2CbSize = = 3 | log2CbSize = = MinCbLog2SizeY && log2CbSize > 3 |
| 0 | PART_2Nx2N | 1 | 1 |
| 1 | PART_Nx2N | 01 | 01 |
| 2 | PART_2Nx2N | 00 | 001 |
| 3 | PART_NxN | | 000 |

The same CU level syntax as shown in Table 4 can be used to support the exemplary binarization tables of part_mode as shown in Tables 6-12.

In another example, only NxN and 2Nx2N partition modes are allowed for IntraBC prediction. The binarization of part_mode for intra_bc_flag equal to 1 is shown in Table 12.

TABLE 12

| part_mode | PartMode | Bin string | |
|---|---|---|---|
| | | log2CbSize > MinCbLog2SizeY | log2CbSize = = MinCbLog2SizeY |
| 0 | PART_2Nx2N | — | 1 |
| 1 | PART_NxN | — | 0 |

A CU level syntax design to support the binarization of Table 12 is shown in Table 13.

TABLE 13

| | Descriptor | Note |
|---|---|---|
| coding_unit( x0, y0, log2CbSize ) { | | |
|   if( transquant_bypass_enabled_flag ) | | |
|     cu_transquant_bypass_flag | ae(v) | |
|   if( slice_type != I ) | | |
|     cu_skip_flag[ x0 ][ y0 ] | ae(v) | |
|   nCbS = ( 1 << log2CbSize ) | | |
|   if( cu_skip_flag[ x0 ][ y0 ] ) | | |
|     prediction_unit( x0, y0, nCbS, nCbS ) | | |
|   else { | | |
|     if( intra_block_copy_enabled_flag ) | | |
|       intra_bc_flag[ x0 ][ y0 ] | ae(v) | |
|     if( !intra_bc_flag[ x0 ][ y0 ] && slice_type != I ) | | (13-1) |
|       if( slice_type != I ) | | (13-2) |
|       pred_mode_flag | ae(v) | (13-3) |
|     if( CuPredMode[ x0 ][ y0 ] != MODE_INTRA \|\|       log2CbSize = = MinCbLog2SizeY ) | | |
|       part_mode | ae(v) | |
|   } | | |
| ... | | |

In Table 13, a test condition for non-IntraBC mode in a non-Intra slice is incorporated as indicated by Note (13-1). On the other hand, the test for a non-Intra slice in the conventional syntax design is removed as indicated by Note (13-2). The flag pred_mode_flag is incorporated as indicated by Note (13-3). The third embodiment can be combined with the first embodiment, the second embodiment or both.

Fourth Embodiment

In this embodiment, the IntraBC prediction is allowed to apply to 2Nx2N, 2NxN, Nx2N, 2NxM and Mx2N partitions. In one example, M can be any positive power-of-2 integer, but less than N (e.g., M=N/2). Examples of the binarization of part_mode with intra_bc_flag equal to 1 are shown in Tables 14 and 15. According to this embodiment, a 2Nx2N IntraBC predicted CU is evenly split into (2N/M) line-based partitions, either in vertical direction (i.e. 2NxM mode) or in horizontal direction (i.e. Mx2N mode). Each 2NxM or Mx2N partition is independently predicted from a matching block within a picture, a slice, or a partial picture, or a partial slice, a region of the picture or slice, or the same CTU containing the current block. Thus, there are 2N/M Intra motion vectors per CU that need to be searched and signaled. In the example that M is equal to N/2, when 2Nx(N/2) partition mode or (N/2)x2N partition mode is selected, the 2Nx2N IntraBC CU is evenly split into four 2Nx(N/2) or (N/2)x2N line-based partitions, respectively. Each 2Nx(N/2) or (N/2)x2N partition can be predicted from a different region within the search range in the current picture, with a distinct motion vector. The fourth embodiment can be combined with any combination of the first embodiment, the second embodiment and the third embodiment.

TABLE 14

| part_mode | PartMode | Bin string | |
|---|---|---|---|
| | | log2CbSize > MinCbLog2SizeY | log2CbSize = = MinCbLog2SizeY |
| 0 | PART_2Nx2N | 1 | 1 |
| 1 | PART_2NxN | 011 | 01 |
| 2 | PART_Nx2N | 001 | 001 |
| 3 | PART_NxN | | 000 |
| 4 | PART_2NxM | 010 | |
| 5 | PART_Mx2N | 000 | |

TABLE 15

| part_mode | PartMode | Bin string | |
|---|---|---|---|
| | | log2CbSize > MinCbLog2SizeY | log2CbSize = = MinCbLog2SizeY |
| 0 | PART_2Nx2N | 1 | 1 |
| 1 | PART_Nx2N | 011 | 01 |
| 2 | PART_2NxN | 001 | 001 |
| 3 | PART_NxN | | 000 |
| 4 | PART_Mx2N | 010 | |
| 5 | PART_2NxM | 000 | |

Fifth Embodiment

In this embodiment, the IntraBC prediction is applied to asymmetric partitions. In one example, similar to the AMP (Asymmetric Motion Partition) in HEVC Inter prediction, partition modes PART_2NxnU, PART_2NxnD, PART_nLx2N and PART_nRx2N can be applied to a 2Nx2N IntraBC predicted CU. Furthermore, in another example, the definitions of PART_2NxnU, PART_2NxnD, PART_nLx2N and PART_nRx2N are the same as the definitions of those partition modes for HEVC inter prediction when AMP is enabled. In another example, nU, nD, nL and nR can be any positive integer that is power of 2 but less than N. Examples of the binarization of part_mode for intra_bc_flag equal to 1 are shown in Tables 16 and 17. In this case, each 2NxnU, 2NxnD, nLx2N or nRx2N partition is independently predicted from a matching block within a picture, a slice, or a partial picture, or a partial slice, a region of the picture or slice, or the same CTU containing the current block. Two Intra motion vectors per CU need to be searched and signaled. The fifth embodiment can be combined with any combination of the first embodiment, the second embodiment and the third embodiment.

TABLE 16

| part_mode | PartMode | Bin string | |
|---|---|---|---|
| | | log2CbSize > MinCbLog2SizeY | log2CbSize = = MinCbLog2SizeY |
| 0 | PART_2Nx2N | 1 | 1 |
| 1 | PART_2NxN | 011 | 01 |
| 2 | PART_Nx2N | 001 | 001 |
| 3 | PART_NxN | | 000 |
| 4 | PART_2NxnU | 0100 | |
| 5 | PART_2NxnD | 0101 | |
| 6 | PART_nLx2N | 0000 | |
| 7 | PART_nRx2N | 0001 | |

TABLE 17

| part_mode | PartMode | Bin string | |
|---|---|---|---|
| | | log2CbSize > MinCbLog2SizeY | log2CbSize = = MinCbLog2SizeY |
| 0 | PART_2Nx2N | 1 | 1 |
| 1 | PART_2NxN | 011 | 01 |
| 2 | PART_Nx2N | 001 | 001 |
| 3 | PART_NxN | | 000 |
| 4 | PART_2NxnU | 0100 | |
| 5 | PART_2NxnD | 0101 | |
| 6 | PART_nLx2N | 0000 | |
| 7 | PART_nRx2N | 0001 | |

Sixth Embodiment

In this embodiment, combinations of the above embodiments are disclosed. Also, high level syntax flags to enable or disable these methods in sequence level, picture level or slice level are disclosed. In one example, an SPS (sequence parameter set) flag (e.g., non_square_ibc_enabled_flag) is used to specify whether non-square IntraBC prediction partitions is allowed for this sequence. The syntax and semantics are illustrated in Table 18.

TABLE 18

| | Descriptor | Note |
|---|---|---|
| seq_parameter_set_rbsp( ) { | | |
| ...... | u(4) | |
| sps_extension1_flag | u(1) | |
| if( sps_extension1_flag ) { | | |
| transform_skip_rotation_enabled_flag | u(1) | |
| transform_skip_context_enabled_flag | u(1) | |
| intra_block_copy_enabled_flag | u(1) | |
| if( intra_block_copy_enabled_flag) | | (18-1) |
| non_square_ibc_enabled_flag | u(1) | (18-2) |
| residual_dpcm_intra_enabled_flag | u(1) | |
| residual_dpcm_inter_enabled_flag | u(1) | |
| extended_precision_processing_flag | u(1) | |
| intra_smoothing_disabled_flag | u(1) | |
| sps_extension2_flag | u(1) | |
| } | | |
| ...... | | |
| } | | |

As shown in Table 18, a new flag non_square_ibc_enabled_flag to indicate whether non-square IntraBC is enabled is incorporated as indicated by Note (18-2) if intra_block_copy_enabled_flag has a value of 1 as indicated by Note (18-1). non_square_ibc_enabled_flag equal to 1 specifies that non-square prediction partitions may be used in IntraBC predicted coding tree blocks. non_square_ibc_enabled_flag equal to 0 specifies that non-square prediction partitions cannot be used in IntraBC predicted coding tree blocks.

In another example, an SPS flag asymmetric_ibc_enabled_flag is used to specify whether asymmetric IntraBC prediction partitions may be applied to this sequence. An example of the syntax and semantics are shown in Table 19.

TABLE 19

| | Descriptor | Note |
|---|---|---|
| seq_parameter_set_rbsp( ) { | | |
| ...... | u(4) | |
| sps_extension1_flag | u(1) | |
| if( sps_extension1_flag ) { | | |
| transform_skip_rotation_enabled_flag | u(1) | |
| transform_skip_context_enabled_flag | u(1) | |
| intra_block_copy_enabled_flag | u(1) | |
| if( intra_block_copy_enabled_flag) { | | (19-1) |
| non_square_ibc_enabled_flag | u(1) | (19-2) |
| if(non_square_ibc_enabled_flag) | | (19-3) |
| asymmetric_ibc_enabled_flag | u(1) | (19-4) |
| } | | |
| residual_dpcm_intra_enabled_flag | u(1) | |
| residual_dpcm_inter_enabled_flag | u(1) | |
| extended_precision_processing_flag | u(1) | |
| intra_smoothing_disabled_flag | u(1) | |
| sps_extension2_flag | u(1) | |
| } | | |
| ...... | | |
| } | | |

As shown in Table 19, a new flag non_square_ibc_enabled_flag to indicate whether non-square IntraBC is enabled is incorporated as indicated by Note (19-2) if intra_block_copy_enabled_flag has a value of 1 as indicated by Note (19-1). Furthermore, a flag asymmetric_ibc_enabled_flag is incorporated as indicated by Note (19-4) if intra_block_copy_enabled_flag has a value of 1 as indicated by Note (19-3). asymmetric_ibc_enabled_flag equal to 1 specifies that asymmetric prediction partitions (e.g., PART_2N×nU, PART_2N×nD, PART_nL×2N, or PART_nR×2N) may be used in IntraBC predicted coding tree blocks. asymmetric_ibc_enabled_flag equal to 0 specifies that asymmetric prediction partitions is disabled for the IntraBC predicted coding tree blocks.

In yet another example, a new SPS flag multi_part_ibc_enabled_flag is used to specify whether more than two prediction partitions may be applied to one IntraBC CU in this sequence. Two exemplary syntax and semantics are shown in Tables 20A and 20B.

TABLE 20A

| | Descriptor | Note |
|---|---|---|
| seq_parameter_set_rbsp( ) { | | |
| ...... | u(4) | |
| sps_extension1_flag | u(1) | |
| if( sps_extension1_flag ) { | | |
| transform_skip_rotation_enabled_flag | u(1) | |
| transform_skip_context_enabled_flag | u(1) | |
| intra_block_copy_enabled_flag | u(1) | |
| if( intra_block_copy_enabled_flag) { | | (20-1) |
| non_square_ibc_enabled_flag | u(1) | (20-2) |
| if(non_square_ibc_enabled_flag) | | (20-3) |
| multi_part_ibc_enabled_flag | u(1) | (20-4) |
| } | | |
| residual_dpcm_intra_enabled_flag | u(1) | |

TABLE 20A-continued

|  | Descriptor | Note |
|---|---|---|
| residual_dpcm_inter_enabled_flag | u(1) | |
| extended_precision_processing_flag | u(1) | |
| intra_smoothing_disabled_flag | u(1) | |
| sps_extension2_flag | u(1) | |
| } | | |
| ...... | | |
| } | | |

TABLE 20B

|  | Descriptor | Note |
|---|---|---|
| seq_parameter_set_rbsp( ) { | | |
| ...... | u(4) | |
| sps_extension1_flag | u(1) | |
| if( sps_extension1_flag ) { | | |
|   transform_skip_rotation_enabled_flag | u(1) | |
|   transform_skip_context_enabled_flag | u(1) | |
|   intra_block_copy_enabled_flag | u(1) | |
|   if( intra_block_copy_enabled_flag) | | (20-5) |
|     multi_part_ibc_enabled_flag | u(1) | (20-6) |
|   residual_dpcm_intra_enabled_flag | u(1) | |
|   residual_dpcm_inter_enabled_flag | u(1) | |
|   extended_precision_processing_flag | u(1) | |
|   intra_smoothing_disabled_flag | u(1) | |
|   sps_extension2_flag | u(1) | |
| } | | |
| ...... | | |
| } | | |

The modifications of Table 20A from conventional syntax table are highlighted by Notes (20-1) and (20-4). As indicated by Note (20-2), non_square_ibc_enabled_flag is incorporated if intra_block_copy_enabled_flag has a value of 1 as indicated by Note (20-1). As indicated by Note (20-4), multi_part_ibc_enabled_flag is incorporated if non_square_ibc_enabled_flag has a value of 1 as indicated by Note (20-3). multi_part_ibc_enabled_flag equal to 1 specifies that more than two prediction partitions (i.e. 2N×M and M×2N, or 2N×(N/2) and (N/2)×2N) may be used in one IntraBC predicted coding tree block. multi_part_ibc_enabled_flag equal to 0 specifies that no more than two prediction partitions cannot be used in one IntraBC predicted coding tree block.

The modifications of Table 20B from conventional syntax table are highlighted by Notes (20-5) and (20-6). As indicated by Note (20-6), multi_part_ibc_enabled_flag is incorporated if intra_block_copy_enabled_flag has a value of 1 as indicated by Note (20-5).

In yet another example, a new SPS flag log 2_num_part_ibc_minus2 is used to specify the number of partitions that the current IntraBC predicted coding unit is split into. An example of the syntax and semantics is shown in Table 21.

TABLE 21

|  | Descriptor | Note |
|---|---|---|
| seq_parameter_set_rbsp( ) { | | |
| ...... | u(4) | |
| sps_extension1_flag | u(1) | |
| if( sps_extension1_flag ) { | | |
|   transform_skip_rotation_enabled_flag | u(1) | |
|   transform_skip_context_enabled_flag | u(1) | |
|   intra_block_copy_enabled_flag | u(1) | |
|   if( intra_block_copy_enabled_flag) { | | (21-1) |
|     non_square_ibc_enabled_flag | u(1) | (21-2) |
|     if(non_square_ibc_enabled_flag) | | (21-3) |

TABLE 21-continued

|  | Descriptor | Note |
|---|---|---|
|     multi_part_ibc_enabled_flag | u(1) | (21-4) |
|     if(multi_part_ibc_enabled_flag) | | (21-5) |
|       log2_num_part_ibc_minus2 | ue(v) | (21-6) |
|   } | | |
|   residual_dpcm_intra_enabled_flag | u(1) | |
|   residual_dpcm_inter_enabled_flag | u(1) | |
|   extended_precision_processing_flag | u(1) | |
|   intra_smoothing_disabled_flag | u(1) | |
|   sps_extension2_flag | u(1) | |
| } | | |
| ...... | | |
| } | | |

The modifications of Table 21 from conventional syntax table are highlighted by Notes (21-1) and (21-6). As indicated by Note (21-2), non_square_ibc_enabled_flag is incorporated if intra_block_copy_enabled_flag has a value of 1 as indicated by Note (21-1). Furthermore, additional flags may also be incorporated in this case depending on test results. As indicated by Note (21-4), multi_part_ibc_enabled_flag is incorporated if non_square_ibc_enabled_flag has a value of 1 as indicated by Note (21-3). As indicated by Note (21-6), log 2_num_part_ibc_minus2 is incorporated if multi_part_ibc_enabled_flag has a value of 1 as indicated by Note (21-5). log 2_num_part_ibc_minus2 plus 2 specifies the value of the number of partitions in the IntraBC coding unit as follows:

$$NumPartitionIntraBC = 2^{(log\ 2\_num\_part\_ibc+2)}.$$

For example, the IntraBC predicted CU may be evenly split into NumPartitionIntraBC partitions either in vertical or in horizontal direction.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of signaling of coding mode including an IntraBC mode (Intra-block copy mode) for a picture, wherein the picture is divided into multiple coding units (CU), the method comprising:
receiving input data associated with a current coding unit in a current picture, wherein the current coding unit is coded using a prediction mode selected from a prediction mode group comprising a Skip mode, an Inter mode, the IntraBC mode and an Intra mode;
if the Skip mode is selected for the current coding unit:
encoding or decoding the Skip mode using a first binary codeword with 1 bit; and
encoding or decoding the current coding unit without any residue information and motion information;
if the Inter mode is selected for the current coding unit:
encoding or decoding the Inter mode using a second binary codeword with 2 bits; and
encoding or decoding the current coding unit using temporal prediction;
if the IntraBC mode is selected for the current coding unit:
encoding or decoding the IntraBC mode using a third binary codeword with 3 bits; and
encoding or decoding the current coding unit using Intra motion compensated prediction based on reconstructed pixels of the current picture; and
if the Intra mode is selected for the current coding unit:
encoding or decoding the Intra mode using a fourth binary codeword with 3 bits; and
encoding or decoding the current coding unit using spatial prediction.

2. The method of claim 1, wherein the first codeword, the second codeword, the third codeword and the fourth codeword correspond to {1, 00, 011, 010} respectively.

* * * * *